United States Patent
Zhu et al.

(10) Patent No.: US 10,216,155 B2
(45) Date of Patent: Feb. 26, 2019

(54) BUILDING MANAGEMENT SYSTEM ANALYSIS

(71) Applicant: Honeywell International Inc., Morristown, NJ (US)

(72) Inventors: Xiaoxun Zhu, Suzhou (CN); Luther Zhang, Beijing (CN); Henry Chen, Beijing (CN); Muli Liu, Beijing (CN); Yi Sun, Beijing (CN); Binbin Zhang, Beijing (CN)

(73) Assignee: Honeywell International Inc., Morris Plains, NJ (US)

( * ) Notice: Subject to any disclaimer, the term of this patent is extended or adjusted under 35 U.S.C. 154(b) by 713 days.

(21) Appl. No.: 14/447,828

(22) Filed: Jul. 31, 2014

(65) Prior Publication Data

US 2016/0033946 A1  Feb. 4, 2016

(51) Int. Cl.
| | | |
|---|---|---|
| G05B 15/02 | (2006.01) | |
| G06T 17/05 | (2011.01) | |
| G06T 11/20 | (2006.01) | |
| G06Q 10/06 | (2012.01) | |

(52) U.S. Cl.
CPC .......... *G05B 15/02* (2013.01); *G06Q 10/063* (2013.01); *G06T 11/206* (2013.01)

(58) Field of Classification Search
CPC .......... G05B 15/02; G05B 2219/23258; G05B 2219/32128; G06F 17/5004; G06F 1/28; G06F 3/048

See application file for complete search history.

(56) References Cited

U.S. PATENT DOCUMENTS

| | | |
|---|---|---|
| 8,356,248 B1 | 1/2013 | Killalea |
| 2007/0033632 A1 | 2/2007 | Baynger et al. |
| 2008/0294662 A1 | 11/2008 | Chen |
| 2009/0125825 A1* | 5/2009 | Rye ................... G05B 23/0216 715/764 |
| 2009/0199118 A1* | 8/2009 | Sabato ................. G06F 11/321 715/765 |
| 2010/0106543 A1 | 4/2010 | Marti |
| 2010/0162110 A1 | 6/2010 | Williamson |
| 2010/0283606 A1* | 11/2010 | Tsypin ................... G06Q 30/02 340/540 |
| 2010/0318200 A1 | 12/2010 | Foslien et al. |
| 2011/0087988 A1 | 4/2011 | Ray et al. |
| 2011/0167343 A1* | 7/2011 | Wright ................. G06T 11/206 715/711 |
| 2011/0184563 A1* | 7/2011 | Foslien ............. B60H 1/00985 700/276 |

(Continued)

OTHER PUBLICATIONS

"SmartStruxure™ solution", Schneider Electric Website <http://www2.schneider-electric.com/sites/corporate/en/products-services/buildings/smartstruxure/videos.page>, 1 pg. Date Accessed: Jul. 30, 2014.

(Continued)

*Primary Examiner* — Sang H Kim
(74) *Attorney, Agent, or Firm* — Honeywell International Inc.

(57) ABSTRACT

Devices, methods, and systems for building management system analysis are described herein. One method includes embedding a plurality of statistics associated with a building within a graphical display of the building and displaying a timeline of the plurality of statistics within the graphical display.

19 Claims, 5 Drawing Sheets

(56) References Cited

U.S. PATENT DOCUMENTS

| | | | |
|---|---|---|---|
| 2011/0270584 A1* | 11/2011 | Plocher | G06F 17/5004 |
| | | | 703/1 |
| 2012/0022700 A1 | 1/2012 | Drees et al. | |
| 2012/0166497 A1 | 6/2012 | Choi et al. | |
| 2012/0296609 A1* | 11/2012 | Khan | G06T 19/00 |
| | | | 703/1 |
| 2013/0002697 A1 | 1/2013 | Ashley et al. | |
| 2013/0173062 A1 | 7/2013 | Koenig-Richardson | |
| 2014/0049402 A1 | 2/2014 | Beaulieu et al. | |
| 2015/0341980 A1* | 11/2015 | Gallo | H04W 84/18 |
| | | | 702/188 |

OTHER PUBLICATIONS

"IBM TRIRIGA Energy Optimization", Version, I, Release I, IBM Website <http://pic.dhe.ibm.com/infocenter/tivihelp/v57r1/topic/com.ibm.iteo.doc/infocenter.pdf>, Jun. 2012, 184 pgs.

"CleanSource Operator Interface, Active Power—Intuitive UPS operator interface", Active Power, Inc. <http://www.activepower.com/documents/datasheets/DISP-US-w.pdf>, 2 pgs. Date Accessed: Jul. 30, 2014.

* cited by examiner

BUILDING MANAGEMENT SYSTEM ANALYSIS

TECHNICAL FIELD

The present disclosure relates to devices, methods, and systems for building management system analysis.

BACKGROUND

Building information modeling (BIM) can refer to the generation and/or management of data associated with a building (e.g., data associated with the components, equipment, and/or properties of the building). For example, BIM data can include architectural, mechanical, electrical, plumbing, sanitary, fire, and/or geometrical information associated with a building.

An operations and/or domain analyst (e.g., a maintenance person, user) of a building may be responsible for diagnosing, fixing, and/or resolving problems (e.g., faults and/or abnormalities) associated with the building (e.g., associated systems of the building). The analyst may also be responsible for diagnosing and/or improving poor performance (e.g., poor performance factors) of the building (e.g., of a system of the building).

In order to properly perform these tasks, however, the analyst has to have a sufficient understanding of the operational context of the building, and a sufficient understanding of the source of the problem and/or poor performance. Accordingly, the analyst may need a significant amount of time to review numerous (e.g., separate) sources of data in order to understand and identify a source of a problem. For example, in previous approaches, the data may be presented to the analyst in the form of data logs, such as spread sheets, performance reports, charts, etc., which may be time consuming and/or difficult for the operator to review, understand, and/or assess.

DETAILED DESCRIPTION

Devices, methods, and systems for building management system analysis are described herein. For example, one or more embodiments include embedding a plurality of statistics associated with a building within a graphical display of the building and displaying a timeline of the plurality of statistics within the graphical display.

Providing building management system analysis in accordance with one or more embodiments of the present disclosure can provide an operations and/or domain analyst (e.g., maintenance person, specialist, user, etc.) with meaningful information that is compiled in an efficient and effective manner. For example, displaying a timeline of a plurality of statistics associated with a building in accordance with one or more embodiments of the present disclosure can improve the ability of an operations and/or domain analyst of the building to identify a source of a problem (e.g., abnormalities, failures, faults, etc.), duration of problem, assess, diagnose, and/or resolve issues associated with the building system.

As an additional example, one or more embodiments of the present disclosure can provide an operations and/or domain analyst with information that can assist with assessing and identifying building problems and/or performance issues via spatial context representation and map data along a timeline. Further, one or more embodiments of the present disclosure can compile various sources of statistical data, which can reduce the amount of data the operations and/or domain analyst has to review and understand in order to identify potential problems and/or performance issues. Accordingly, one or more embodiments of the present disclosure can provide effective and efficient means for reviewing and identifying possible problems and performance issues.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits. For example, 250 may reference element "30" in FIG. 2, and a similar element may be referenced as 350 in FIG. 3. For instance, element 222 references the timeline in FIGS. 2 and 322 correspondingly references the timeline in FIG. 3.

As used herein, "a" or "a number of" something can refer to one or more such things. For example, "a number of components" can refer to one or more components.

Figure 1:
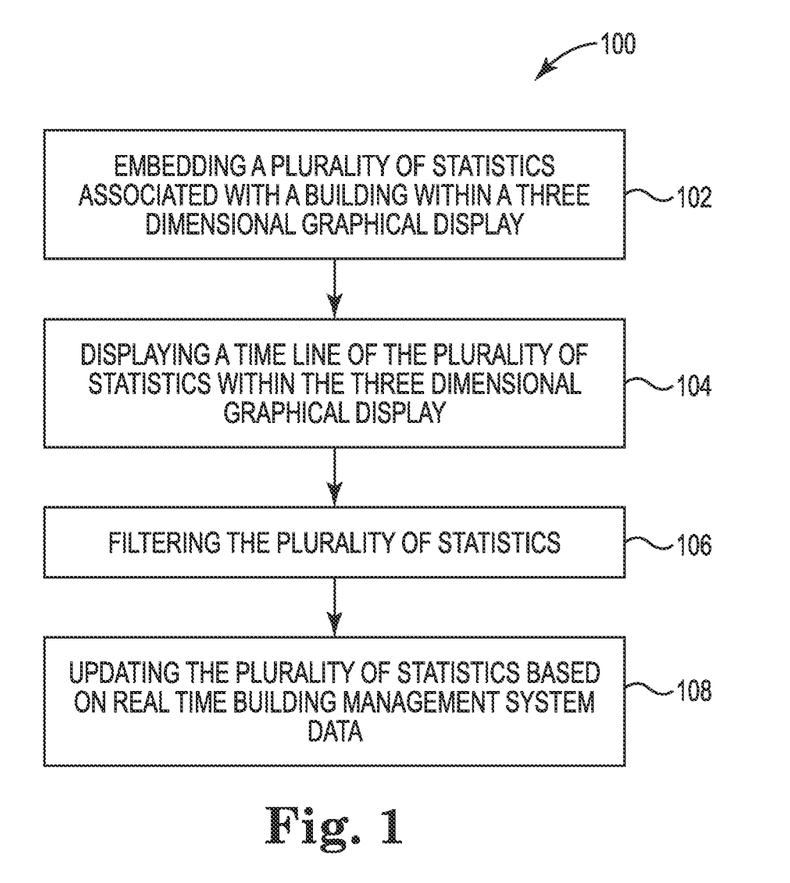
FIG. 1 illustrates a method for building management system analysis in accordance with one or more embodiments of the present disclosure.

FIG. 1 illustrates a method 100 for building management system analysis in accordance with one or more embodiments of the present disclosure. Method 100 can be performed, for example, by computing device 560 described in connection with FIG. 5.

The analysis can be can be provided (e.g., displayed and/or presented), for example, to an operations and/or domain analyst of the building. However, embodiments of the present disclosure are not so limited. For example, the analysis can be provided to any person and/or entity responsible for diagnosing, fixing, and/or resolving problems (e.g., faults, and/or abnormalities) associated with the building, and/or any person and/or entity responsible for diagnosing and/or improving poor performance (e.g. performance factors) of the building.

At block 102, the method 100 includes embedding a plurality of statistics associated with a building within a graphical display. The plurality of statistics can include information associated with a building (e.g., with one or more rooms, areas, and/or spaces of the building), such as, for example, energy consumption, humidity, temperature, air ventilation/HVAC, water (e.g., water flow), power usage, gas, pipes, and/or fire, among other information. In some embodiments, the plurality of statistics can include real time and/or historical data associated with the building and/or data logs associated with the building. For example, the energy consumption in a particular area of the building on a particular date can be identified. Additionally, the energy consumption within a building over a period of time can be logged. The plurality of statistics can be collected by the computing device, and the display can be generated by the computing device. Although a three-dimensional graphical display is depicted in the drawings (e.g., FIGS. 2-4), alternative displays can be generated, such as a two-dimensional graphical display.

In some embodiments, the plurality of statistics can be color coded to indicate a severity level and/or a status. For example, if a current temperature of the building is outside a predetermined range, the temperature statistic can be color coded to indicate the outside-range severity. For instance, the color red can indicate a highest severity, orange for a high severity, yellow for a moderate severity.

At block 104, the method 100 includes displaying a timeline of the plurality of statistics within the three dimensional graphical display. In some embodiments, the timeline can include a condensing, visualization, and/or a diagnosis of the plurality of statistics, as will be further described herein (e.g., in connection with FIG. 3). In some embodiments, the timeline can include a highlighting of an abnormal statistic associated with the building, as will be further described herein (e.g., in connection with FIG. 3).

In some embodiments, the timeline can include a comparison of the plurality of statistics at different time periods. For example, the level of humidity within the building over a period of hours, day, weeks, or even years, can be compared to that of a different period of time (e.g., hours, days, weeks, years, etc.).

At block 106, the method 100 includes filtering the plurality of statistics. The plurality of statistics can be filtered by, for example, category, subcategory, log type, data type, system, a threshold value, and/or subsystem. For example, the plurality of statistics can be grouped based on the system. For instance, the HVAC system can have statistics relevant to air flow, temperature, ducts, heating/cooling, among others. In some embodiments, a user can designate the filter premises. For example, the user can filter the statistics based on the HVAC system. The filtered results can show statistics relevant to the HVAC system within the three dimensional display. For instance, the functioning ducts, temperature(s) within the building, and/or air flow, among others, can be displayed.

At block 108, the method 100 includes updating the plurality of statistics based on real time building management system data. For example, the plurality of statistics can be dynamically updated with current (e.g., present) building information. For instance, temperature changes within the building can be updated. Further, although not shown in FIG. 1, in some embodiments the method 100 can include providing a comparison of the plurality of statistics to an acceptable functioning level of the building. Acceptable functioning levels of the building can include a comparison of current or past operating levels of a building to an ideal and/or threshold operating level. For example, the current operating level of electricity consumption may be at a first level, and the ideal and/or threshold operating level of building electricity consumption may be at a second level. The current or past electricity consumption statistic can be compared to the ideal and/or threshold operating level to determine if the current or past statistic is outside of an acceptable (e.g., ideal, threshold) operating level.

Figure 2:
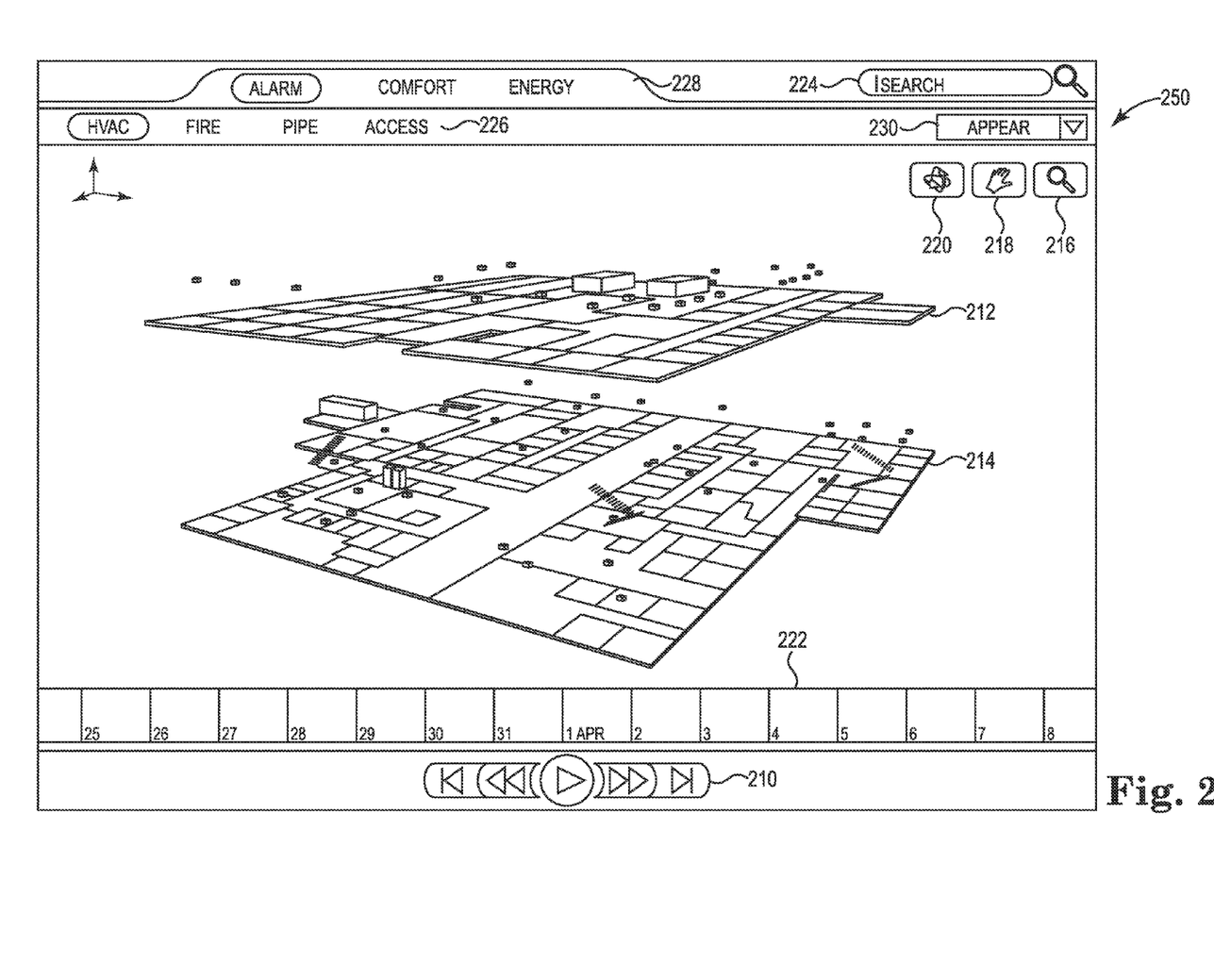
FIG. 2 illustrates an example of a display for building management system analysis in accordance with one or more embodiments of the present disclosure.

FIG. 2 illustrates an example of a display (e.g., graphical display) 250 for building management system analysis in accordance with one or more embodiments of the present disclosure. Graphical display 250 can be provided (e.g., displayed and/or presented) to a user of a computing device, such as computing device 560 described in connection with FIG. 5.

A plurality of statistics associated with a building can be embedded within three dimensional graphical display 250. In some embodiments, the three dimensional graphical display 250 can separate the plurality of statistics based on a category 228. For example, the categories 228 can include energy, comfort, and alarm, among others, as shown in FIG. 2. Selecting the alarm category can display subcategories 226 related to the alarm category and/or the plurality of statistics associated with an alarm feature. For example, selecting the alarm category 228 can display subcategories 226, such as HVAC, fire, pipe, access, among others, as shown in FIG. 2. The subcategories 226 can be selected and displayed within the three dimensional graphical display 250. In some embodiments, selecting a subcategory can highlight activity associated with the selected subcategory. For example, selecting the alarm category 228, then selecting the HVAC subcategory 226 can display heating, cooling, and ventilation statistics within the three dimensional graphical display 250. The statistics associated with the HVAC subcategory can be highlighted for efficient assessment and/or analysis. As will be discussed in further detail in FIG. 4, in some embodiments, a drop down menu 230 can be selected to quickly display the plurality of statistics within the three dimensional display. For example, the drop down menu 230 can display humidity, consumption, occurrence times, as well as abnormal duration times of statistics. The selected statistic from the drop down menu 230 can display within the three dimensional graphical display to show visual representation. The visual representation can assist a user when diagnosing or determining a location and/or time of abnormal events.

In some embodiments, the three dimensional graphical display 250 can depict the layout of single or multiple levels of a building, such as, for instance a single level 212 of a building, that includes details such as individual rooms, stairwells, hallways, etc. Alternatively, the three dimensional graphical display 250 can depict additional layout views to a user via multi-tiered building levels 212, 214, as shown in FIG. 2. A user can manipulate the perspective view by altering the view perspective 218 of the three dimensional display. For example, the view perspective 218 can display views top, front, side, etc. A user can also zoom 216 to a specific area for closer inspection. Alternatively, a user can zoom 216 out for a macro-level view of the three dimensional display. In some embodiments, a user can rotate 220 the image along its axis, thereby achieving a variety of depth and angle perspectives.

In some embodiments, the three dimensional graphical display 250 can include a search 224 feature, as shown in FIG. 2. The search 224 feature can identify a particular searched statistic. The search 224 feature can locate and identify the particular statistic among the plurality of statistics embedded within the three dimensional graphical display 250. For example, if a user searches for temperature, the statistics associated with temperature can be presented within the three dimensional graphical display 250 and displayed to the user. The statistics associated with temperature can be highlighted within the three dimensional graphical display 250 for easy viewing and assessment.

In some embodiments, a timeline 222 can be displayed within the three dimensional graphical display 250. The timeline 222 can be a span of time, including minutes, hours, days, weeks, months, years, etc. As will be discussed in further detail in FIG. 5, information associated with the plurality of statistics can be represented on the timeline 222 within the three dimensional graphical display 250.

In some embodiments, the timeline 222 can include a playback function 210, as shown in FIG. 2. The playback function 210 can playback the events and/or states of the system within a spatial context (e.g., display 250). The playback function 210 includes fast-forward, slow-forward, play, slow-rewind, rewind functionality, as shown in FIG. 2. An analyst can apply the functionality to view a span of time to gather information on the events occurring during the specific span of time selected. The spatial context along the timeline 222 can assist a user to playback events and identify possible problems and/or performance issues in a rapid and efficient manner.

Figure 3:
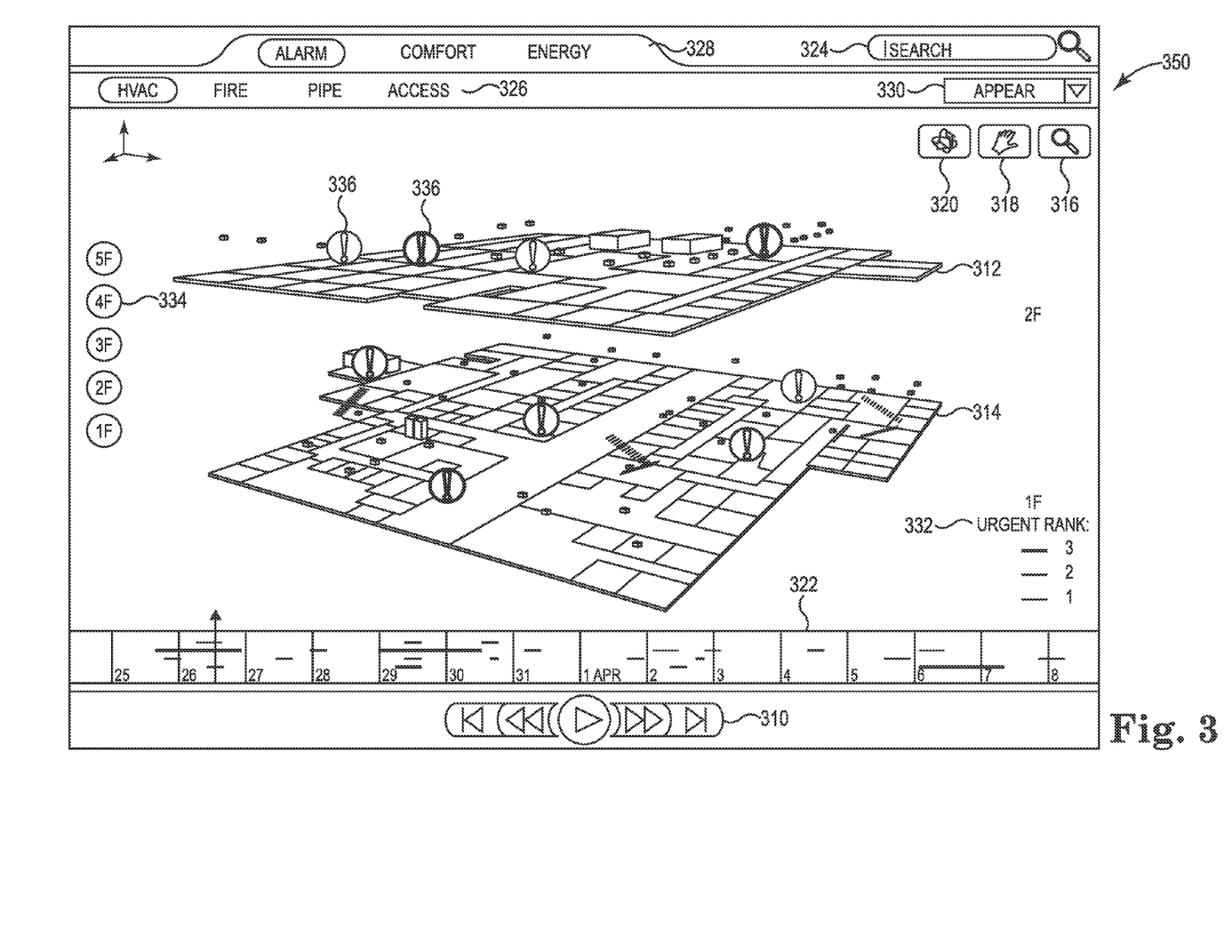
FIG. 3 illustrates an example of a display for building management system analysis in accordance with one or more embodiments of the present disclosure.

FIG. 3 illustrates an example of a display (e.g., graphical display) 350 for building management system analysis in accordance with one or more embodiments of the present disclosure. Graphical display 350 can be provided (e.g., displayed and/or presented) to a user of a computing device, such as computing device 560 described in connection with FIG. 5.

A three dimensional graphical display 350 can depict the layout of single or multiple levels 312, 314 of a building, in a manner analogous to that previously described in connection with FIG. 2. A user can select the particular floor and/or number of floors to be displayed 334, manipulate the view by altering the view perspective 318, using zoom 316, and/or rotate 320 of the three dimensional display, in a manner analogous to that previously described in connection with FIG. 2. A user can search 324 statistics, display category 328 and subcategories 326 of statistics in a manner analogous to that previously described in connection with FIG. 2.

A plurality of statistics associated with a building can be embedded within the three dimensional graphical display 350. The embedded plurality of statistics can be displayed within the three dimensional graphical display to represent functioning of the building management system in a spatial context. As will be discussed in further detail in FIG. 4, in some embodiments, a drop down menu 330 can be selected to quickly display the plurality of statistics within the three dimensional display. For example, the drop down menu 330 can display humidity, consumption, occurrence times, as well as abnormal duration times of statistics. For instance, selection of humidity from the drop down menu 330 can display level of humidity within the three dimensional graphical display 350. The visual representation (e.g., bar graphs, numerical value, etc.) of humidity can reflect the levels of humidity within particular locations, and/or overall level of humidity associated with the building. The visual representation can assist a user in identifying problematic locations (e.g., extreme humidity that may cause mold) and addressing the issue.

In some embodiments, the plurality of statistics can be compared to a threshold value. A threshold value can be a set value for a particular building management statistic. For example, the temperature within the building can be compared to a threshold value of a particular temperature. For instance, the temperature within the building can have a threshold value of eighty (80) degrees Fahrenheit. If upon comparison the temperature within the building exceeds (e.g., surpasses) the threshold value, a notification (e.g., alarm, notice, etc.) can be triggered. Once a notification is triggered, the event can be deemed an abnormal event and a user can be notified. The abnormal event can be diagnosed and corrected (e.g., by the user).

In some embodiments, the plurality of statistics can be displayed within a timeline 322. The timeline 322 can be a span of time that includes minutes, hours, days, weeks, months, and years. The timeline 322 can display the information over a determined time span. The plurality of statistics displayed on the timeline 322 can correspond to the plurality of statistics embedded in the three dimensional graphical display 350. For example, energy usage within the building can be depicted (e.g., via bar graph, numerical values, etc.) within the three dimensional graphical display 350. The timeline 322 can have the energy statistic embedded within the timeline 322 representing the energy usage within the building. A user can visually see two different representations of the information: the individual location of the energy usage within the three dimensional graphical display 350, and the energy usage over the course of a period of time on the timeline 322.

In some embodiments, the timeline 322 can include condensing, visualization, and/or a diagnosis of the plurality of statistics. For example, the plurality of statistics can be condensed and displayed across the timeline within the three dimensional graphical display 350 to show a visualization of the statistics to a user (e.g., an analyst, maintenance person, etc.). The plurality of statistics can be color coded across the timeline 322 for assessment ease.

In some embodiments, the timeline 322 can include highlighting of an abnormal statistic associated with the building. Highlighting can be displayed as a length of bar across the timeline 322, the thickness of the bar adjusted based on severity of the abnormal event, as illustrated in FIG. 3. For example, a thick bar across the timeline 322 can represent a severe abnormality. Alternatively, highlighting can be displayed as a thin bar across the timeline 322 to indicate a moderate abnormality. The highlighting (e.g., bars) can be color coded to correspond to an urgency rank. For example, the highlighting of an abnormal statistic can include a length of time across the timeline 322 to indicate the time period of the abnormality. If the abnormal statistic is severe (e.g., fire), the highlighting across the timeline 322 would display a thick red bar (highlight and corresponding urgency rank) from the start time of the abnormal event to the end time of the abnormal event. As another example, during the event of a fire, the temperature within the building may exceed a particular temperature threshold value over a particular time period. The temperature statistic can be displayed across the timeline 322, highlighted as a yellow thin bar to indicate a moderate abnormal event to indicate the time span.

In some embodiments, the timeline 322 can include a playback function 310, as shown in FIG. 3. The playback function 310 can playback the events and state of the system within a spatial context. For instance, the starting point (e.g., time, location, etc.) can be played back to a user. The playback function 310 can identify information relevant to the initial problem and/or causation of an abnormal event. In some embodiments, the playback function 310 can include the plurality of statistics within a particular time period. For example, the playback function 310 can span a period of time in which the plurality of statistics is included. For instance, the playback function 310 can include minutes, hours, days, weeks, months, or years.

In some embodiments, the playback function 310 can display a single statistic among the plurality of statistics within a span of time. For example, the humidity statistic can be displayed in isolation within the timeline 322 for a simpler visualization. Alternatively, the playback function 310 can display multiple statistics among the plurality of statistics within a span of time. For example, temperature, humidity, energy consumption, water consumption, etc. can be displayed as a compilation of statistics within the timeline 322. The plurality of statistics can be compared at different time periods. For example, the temperature in a building throughout a single day can be compared to the temperature in the building throughout a different day. The temperature difference can then be diagnosed if an abnormality is present. The plurality of statistics within the timeline 322 can assist a user in searching for information and provide an overview of the system. For example, the playback function 310 can allow a user to designate and/or search a span of time to identify abnormal events along the timeline 322. The playback function 310 can provide rapid and effective assessment of a situation. Once the situation is assessed, a diagnosis can be identified.

In some embodiments, the plurality of statistics within the three dimensional graphical display 350 can be ranked based on a level of urgency. For example, the urgency rank 322 can be displayed within the three dimensional graphical display 350, as shown in FIG. 3. The urgency rank 332 can be designated by numbers and/or colors. If a statistic, or multiple statistics, are abnormal and/or malfunctioning outside a predetermined range, and/or a dangerous condition(s) is detected, then the single or multiple statistics can be ranked to reflect the urgency. For instance, the temperature may be increasing in specific area of a building. In response to the increase in temperature, the fire alarms may detect a fire.

In some embodiments, the plurality of statistics can overlap and/or interconnect to provide an accurate assessment of conditions. Different statistics within the plurality of statistics can be assigned an urgency rank 332. The urgency rank 332 assigned to a first statistic can be influenced by an urgency rank 332 assigned to a second statistic. Using the example described above, the fire can be assigned a greater urgency rank 332 than the urgency rank 332 assigned to temperature. Based on the urgency rank, the system and/or a user can identify which problem to prioritize and address.

In some embodiments, the plurality of statistics can be color coded within the three dimensional graphical display 350 to indicate a priority level. A priority level 336 can help a user (e.g., analyst) assess the situation efficiently and identify the order in which to address abnormal functioning and/or problems within the system. The color codes can correspond to the different priority levels 336. For instance, red can indicate the highest priority level 336, while green can represent the lowest priority level 336.

In some embodiments, the priority level 336 associated with the plurality of statistics can be embedded within the three dimensional graphical display 350 at the particular location containing the abnormal activity. For example, energy usage exceeding a threshold value may be assigned a red color code to indicate an abnormality and high priority level 336. Alternatively, an increase in water consumption may be assigned a yellow color to indicate a moderate change and low priority 336. In some embodiments, the urgency rank 332 can correspond to the priority level 336. For example, a critical urgency rank 332 may correspond to a high priority level 336, and the color can appear red. Alternatively, a statistic assigned a high urgency rank 332 may have a moderate priority level 336, with a color code of orange to indicate a high urgency but lower priority.

In some embodiments, the plurality of statistics can be real time dynamic data. For example, the plurality of statistics can be updated in real time. The plurality of statistics can dynamically update within the three dimensional graphical display 350. For instance, a temperature statistic within a building can be monitored to show the change in temperature throughout the day, week, month, and/or year.

In some embodiments, the three dimensional graphical display can be based on a task of a user of the computing device. A task can be a command and/or a search issued by a user. For example, the task can include setting a threshold value for a particular statistic. For instance, the temperature threshold value may be changed to a higher or lower threshold value to prevent unnecessary notification alarms, urgency ranking, and/or assessment. A particular task can be searched. For example, a task can include searching for abnormalities associated with a particular statistic. For instance, a task can search for abnormalities associated with a temperature statistic over a period of time. The user can then make an assessment and modify the temperature threshold accordingly.

Figure 4:
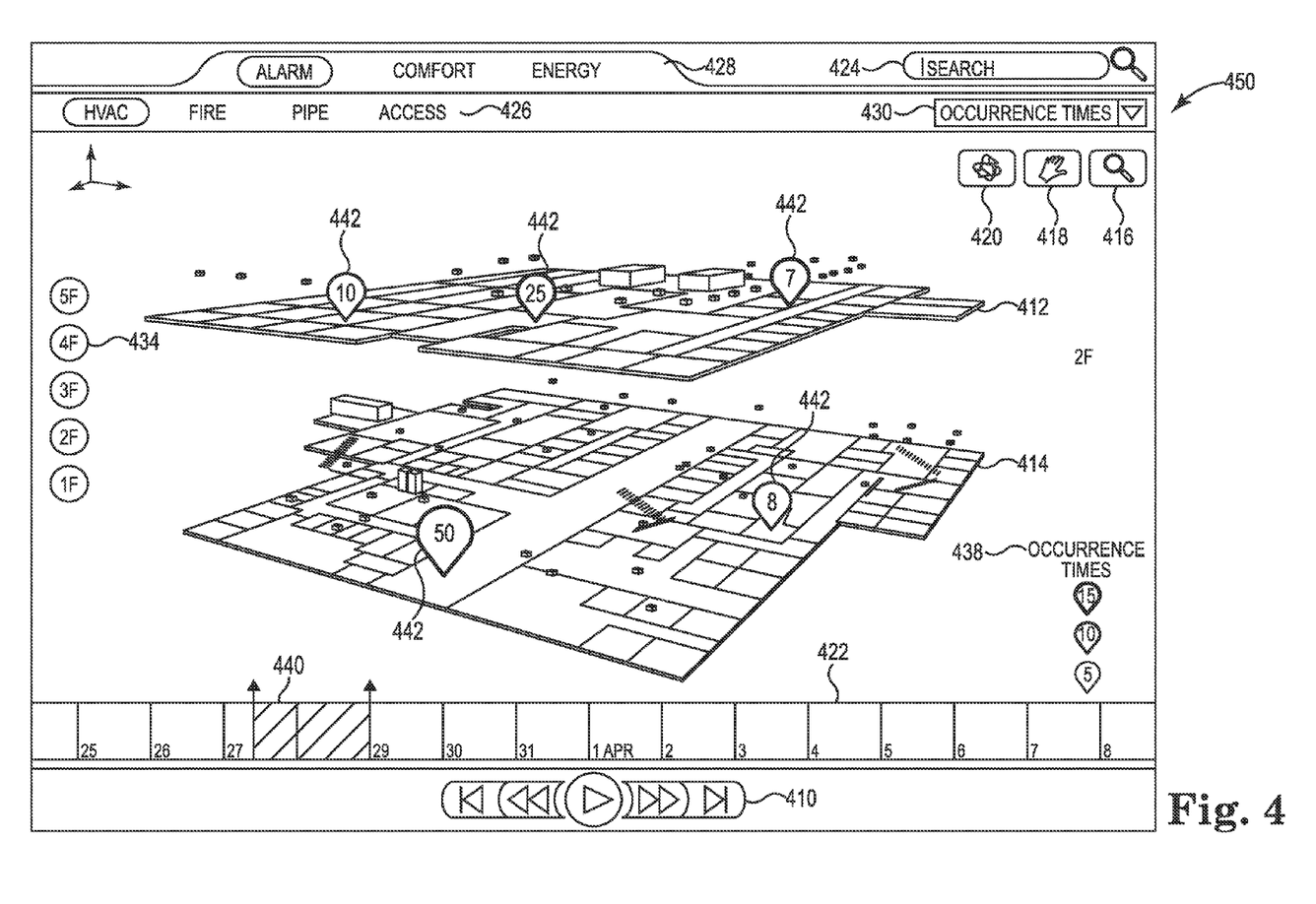
FIG. 4 illustrates an example of a display for building management system analysis in accordance with one or more embodiments of the present disclosure.

FIG. 4 illustrates an example of a display for building management system analysis in accordance with one or more embodiments of the present disclosure. Graphical display 450 can be provided (e.g., displayed and/or presented) to a user of a computing device, such as computing device 560 described in connection with FIG. 5.

A three dimensional graphical display 450 can depict the layout of single or multiple levels 412, 414 of a building, in a manner analogous to that previously described in connection with FIG. 2. A user can select the particular floor and/or number of floors to be displayed 434, manipulate the view by altering the view perspective 418, using zoom 416, and/or rotate 420 of the three dimensional display 450, in a manner analogous to that previously described in connection with FIG. 2. A user can search 424 statistics, display category 428 and subcategories 426 of statistics in a manner analogous to that previously described in connection with FIG. 2.

A plurality of statistics associated with a building can be embedded within the three dimensional graphical display 450. The embedded plurality of statistics displayed within the three dimensional graphical display 450 can represent functioning of the building management system in a spatial context. In some embodiments, the drop down menu 430 can reveal a number of occurrence times associated with the plurality of statistics. Occurrence times can visually and/or numerically represent the number of times and/or the locations within a graphical display in which a particular statistic event has occurred. Occurrence times 438 can indicate the number of times a particular static event occurred (e.g., number of times an event happened) over a period of time.

In some embodiments, the occurrence times 438 can be displayed numerically within the three dimensional graphical display 450. For example, the occurrence times 438 for a particular statistic can be displayed within the three dimensional graphical display 450. For instance, a statistic relating to power outages can reveal the number of times (e.g. a numerical value) the building experienced power outages within the three dimensional graphical display 450.

In some embodiments, the occurrence times 438 can be depicted as an occurrence event 442. The occurrence event 442 can display the location and the occurrence times 438 at the particular location within the three dimensional graphical display 450. The occurrence event 442 can indicate the location and the occurrence times 438 can indicate the number of times a particular event associated with a statistic occurred. For instance, the occurrence event 442 and the occurrence times 438 can display power outages that occurred on specific floors in a particular location of the building. As depicted in FIG. 4, the occurrence times 438 indicate that power outages occurred on the first and second floors of the building in particular locations (e.g., the occurrence event 442) and the number of times the event occurred (e.g., the occurrence times 438).

In some embodiments, the occurrence times 438 can have a variety of sized icons (e.g., bubbles) to indicate increased and/or different (high or low) levels of occurrences. For example, the larger a bubble within a three dimensional display 450, the more numerous (e.g., increased) number of times a particular event happened. As discussed above, the occurrence event 442 and the occurrence times 438 can be displayed within the three dimensional graphical display 450. The occurrence event 442 can include various sizes of bubbles that include the occurrence times 438. In some embodiments, the size of the bubble can vary dependent upon the numerical value associated with the occurrence times 438. For instance, the more numerous the occurrence time 438 (e.g., higher the number, more frequent), the larger the bubble that can appear within the three dimensional graphical display 450. Alternatively, the less numerous the occurrence time 438 (e.g., smaller, less frequent) the smaller the bubble that can appear within the three dimensional graphical display 450.

In some embodiments, the playback function 410 located on the timeline 422 can isolate a particular period of time 440 and display the actual time span of the occurrence times 438 and/or occurrence event 442. The playback function 410 can display the progression of the occurrence times 438 and/or occurrence event 442. For example, a fire may ignite on the second floor of the building. The occurrence times 438 can reflect a "1" to indicate one instance of occurrence. Over a period of time associated with the isolated particular period of time 440, the fire can spread to create more fires. The occurrence times 438 can increase over the particular period of time 440 to reflect the increase (e.g., times) in fires within the three dimensional graphical display 450.

In some embodiments, the playback function 410 can isolate a particular period of time 440 and the occurrence event 442 can display the progression of a particular statistic over the span of the particular period of time 440. For example, a fire may ignite on the first floor within a building. The fire may spread and the location of the fire can change. The occurrence event 442 can display the change in locations within the three dimensional graphical display 450 during the isolated particular period of time 440. The change in locations can change over the particular period of time 440.

In some embodiments, the playback function 410 can isolate a particular period of time 440 and the occurrence event 442 and the occurrence times 438 can be displayed within the three dimensional graphical display. For example, a fire may ignite on the second floor. The fire may spread within the building and create new fires in new locations. The occurrence event 442 can display the particular locations of fires within the three dimensional graphical display 450, while the occurrence times 438 can reveal the number of times fires (e.g., events) were ignited within the location. The occurrence event 442 (e.g., location) and the occurrence times 438 (e.g., number of times) can change over the span of the particular period of time. The timeline 422 and the playback function 410 utilizing the occurrence times 438 and occurrence events 442 within the three dimensional graphical display 450 can present a clear visualization to a user related to a statistic associated with the building over a period of time. The information gleaned from the ability to isolate a time period, view the number of events and locations can assist a user in diagnosing and determining a solution to the event.

Figure 5:
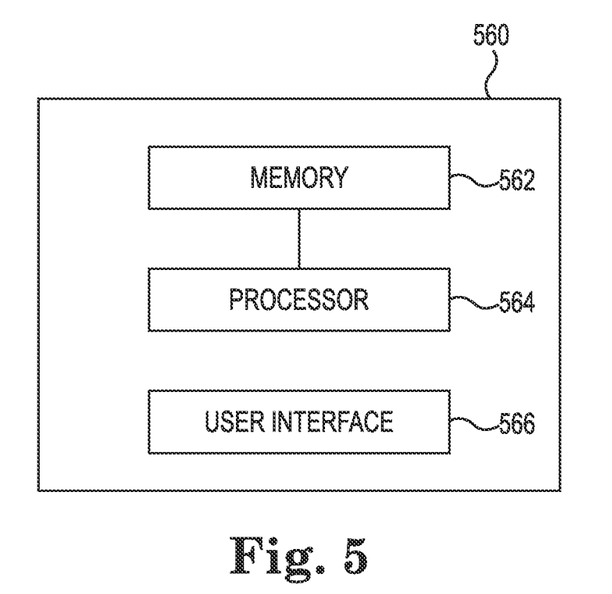
FIG. 5 illustrates a computing device for building management system analysis in accordance with one or more embodiments of the present disclosure.

FIG. 5 illustrates a computing device 560 for building management system analysis in accordance with one or more embodiments of the present disclosure. Computing device 560 can be, for example, a laptop computer, a desktop computer, or a mobile device (e.g., a smart phone, a tablet, a personal digital assistant, etc.), among other types of computing devices.

As shown in FIG. 5, computing device 560 can include a memory 562 and a processor 564 coupled to memory 562. Memory 562 can be any type of storage medium that can be accessed by processor 564 to perform various examples of the present disclosure. For example, memory 562 can be a non-transitory computer readable medium having computer readable instructions (e.g., computer program instructions) stored thereon that are executable by processor 564 to perform building management system analysis in accordance with one or more embodiments of the present disclosure.

Memory 562 can be volatile or nonvolatile memory. Memory 562 can also be removable (e.g., portable) memory, or non-removable (e.g., internal) memory. For example, memory 562 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disc read-only memory (CD-ROM)), flash memory, a laser disc, a digital versatile disc (DVD) or other optical disk storage, and/or a magnetic medium such as magnetic cassettes, tapes, or disks, among other types of memory.

Further, although memory 562 is illustrated as being located in computing device 560, embodiments of the present disclosure are not so limited. For example, memory 562 can also be located internal to another computing resource (e.g., enabling computer readable instructions to be downloaded over the Internet or another wired or wireless connection).

As shown in FIG. 5, computing device 560 can also include a user interface 566. User interface 566 can include, for example, a display (e.g., a screen). The display can be, for instance, a touch-screen (e.g., the display can include touch-screen capabilities). Additionally and/or alternatively, user interface 566 can include a hand-free user interface in which actions and/or instructions can be provided (e.g., to a user of computing device 560) via a speech interface (e.g., synthesized speech), and in which the user can speak (e.g., rather than type) inputs into computing device 560, which can then recognize them.

User interface 566 (e.g., the display of user interface 566) can provide (e.g., display and/or present) information to a user of computing device 560. For example, user interface 566 can provide a three dimensional graphical display of a building, in which a plurality of statistics associated with the building are embedded within the three dimensional graphical display, and a timeline of the plurality of statistics is displayed within the three dimensional graphical display, as previously described herein.

In some embodiments, the three dimensional graphical display can include a multi-perspective visualization of the building. For example, the three dimensional graphical display can show multi-tiered levels of a building, zoom features, orient the building to multiple angles to show different orientations. For instance, the multi-perspective visualization can show a single floor of the building or multiple floors. The three dimensional display can be manipulated to show a variety of perspectives. In some embodiments, the multi-perspective visualization of the building can be controlled by a user. For example, the user can change the perspective so as to zoom in on an area. Alternatively, the user can change the perspective and zoom out so as to view a larger scope of the display.

The user of computing device 560 can be, for example, an operations and/or domain analyst of the building. However, embodiments of the present disclosure are not so limited. For example, the user can be any person and/or entity responsible for diagnosing, fixing, and/or resolving problems (e.g., faults and/or abnormalities) associated with the building, and/or to any person and/or entity responsible for diagnosing and/or improving poor performance (e.g., poor performance factors) of the building. Further, the user and computing device 560 may be co-located (e.g., the user and computing device may both be located in the building), or the user and computing device 560 may not be co-located (e.g., the user may remote into computing device 560 via a network).

Additionally, computing device 560 can receive information from the user of computing device 560 through an interaction with the user via user interface 566. For example, computing device 560 can receive input from the user, such as a selection of one of the number of actions to take in response to the program associated with the particular component, as previously described herein. The user can enter the input into computing device 560 using, for instance, a mouse and/or keyboard, or other peripheral, associated with computing device 560 (e.g., user interface 566), or by touching user interface 566 in embodiments in which user interface 566 includes a touch-screen.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A method for building management system analysis, comprising:
    embedding a plurality of statistics associated with a building within a three dimensional graphical display of the building; and
    displaying a timeline of the plurality of statistics within the three dimensional graphical display, wherein the timeline includes:
        a highlighting of an abnormal statistic associated with the building corresponding to a time period of the abnormal statistic, wherein the highlighting is displayed as a length of a bar across the timeline, and wherein a thickness of the bar is adjusted based on severity of the abnormal statistic;
        an urgency ranking of the highlighted abnormal statistic, wherein the highlighted abnormal statistic exceeds a threshold value; and
        a playback function to select a span of a particular period of time on the timeline, wherein upon a selection of the span of the particular period of time on the timeline, a number of times an event occurs is displayed at a particular location where the event occurs within the three dimensional graphical display.

2. The method of claim 1, wherein the timeline includes a condensing, visualization, and/or diagnosis of the plurality of statistics.

3. The method of claim 1, wherein the plurality of statistics are color coded to indicate a severity level and/or a status.

4. The method of claim 1, wherein the method includes providing a comparison of the plurality of statistics to an acceptable functioning level of the building.

5. The method of claim 1, wherein the timeline includes a comparison of the plurality of statistics at different time periods.

6. The method of claim 1, wherein the plurality of statistics includes: real time and/or historical data associated with the building; and data logs associated with the building.

7. The method of claim 1, wherein the method includes filtering the plurality of statistics.

8. The method of claim 7, wherein filtering the plurality of building statistics includes filtering the plurality of building statistics by log type, data type, system, a threshold value, and/or subsystem.

9. The method of claim 7, wherein a user designates premises by which the plurality of statistics are filtered.

10. The method of claim 1, wherein the method includes updating the plurality of statistics based on real time building management system data.

11. A non-transitory computer readable medium having computer readable instructions stored thereon that are executable by a processor to:
    collect a plurality of statistics associated with a building; and generate a three dimensional graphical display of the building, wherein:
  the plurality of statistics are embedded within the three dimensional graphical display; and
  a timeline of the plurality of statistics is displayed within the three dimensional graphical display, wherein the timeline includes:
    a highlighting of an abnormal statistic associated with the building that corresponds to a time period of the abnormal statistic, wherein the highlighting is displayed as a length of a bar across the timeline, and wherein a thickness of the bar is adjusted based on severity of the abnormal statistic;
    an urgency ranking of the highlighted abnormal statistic, wherein the highlighted abnormal statistic exceeds a threshold value; and
    a playback function to select a span of a particular period of time on the timeline, wherein upon a selection of the span of the particular period of time on the timeline, a number of times an event occurs is displayed at a particular location where the event occurs within the three dimensional graphical display.

12. The computer readable medium of claim 11, wherein the plurality of statistics are color coded within the display to indicate a priority level.

13. The computer readable medium of claim 11, wherein the three dimensional graphical display includes a multi-perspective visualization of the building.

14. A computing device for building management system analysis, comprising:
  a memory; and
  a processor configured to execute executable instructions stored in the memory to:
    collect a plurality of statistics associated with a building;
    embed the plurality of statistics within a three dimensional graphical display of the building; and
    display a timeline of the plurality of statistics within the three dimensional graphical display, wherein the timeline includes:
      a highlighting of an abnormal statistic associated with the building that corresponds to a time period of the abnormal statistic, wherein the highlighting is displayed as a length of a bar across the timeline, and wherein a thickness of the bar is adjusted based on severity of the abnormal statistic;
      an urgency ranking of the highlighted abnormal statistic, wherein the highlighted abnormal statistic exceeds a threshold value; and
      a playback function to select a span of a particular period of time on the timeline, wherein upon a selection of the span of the particular period of time on the timeline, a number of times an event occurs is displayed at a particular location where the event occurs within the three dimensional graphical display.

15. The computing device of claim 14, wherein the timeline includes the plurality of statistics within the particular time period.

16. The computing device of claim 14, wherein the processor is configured to execute the executable instructions to rank the plurality of statistics within the three dimensional graphical display based on a level of urgency.

17. The computing device of claim 14, wherein the plurality of statistics is real time dynamic data.

18. The computing device of claim 14, wherein the processor is configured to execute the executable instructions to configure the three dimensional graphical display based on a task of a user of the computing device.

19. The computing device of claim 14, wherein the processor is configured to execute the executable instructions to compare the plurality of statistics to the threshold value.

* * * * *